US011840234B1

(12) United States Patent
 Ward

(10) Patent No.: US 11,840,234 B1
(45) Date of Patent: *Dec. 12, 2023

(54) MERGE HANDLING BASED ON MERGE INTENTIONS OVER TIME

(71) Applicant: EMBARK TRUCKS INC., San Francisco, CA (US)

(72) Inventor: Erik Ward, San Francisco, CA (US)

(73) Assignee: Embark Trucks Inc., San Francisco, CA (US)

(\*) Notice: Subject to any disclaimer, the term of this patent is extended or adjusted under 35 U.S.C. 154(b) by 0 days.

This patent is subject to a terminal disclaimer.

(21) Appl. No.: 17/980,875

(22) Filed: Nov. 4, 2022

Related U.S. Application Data

(63) Continuation of application No. 17/846,584, filed on Jun. 22, 2022, now Pat. No. 11,491,987.

(51) Int. Cl.
 *B60W 30/18* (2012.01)
 *B60W 30/16* (2020.01)
 (Continued)

(52) U.S. Cl.
 CPC .. *B60W 30/18163* (2013.01); *B60W 30/0956* (2013.01); *B60W 30/16* (2013.01); *B60W 40/04* (2013.01); *B60W 50/0097* (2013.01); *B60W 60/0015* (2020.02); *B60W 60/00274* (2020.02); *B60W 2050/006* (2013.01);
 (Continued)

(58) Field of Classification Search
 None
 See application file for complete search history.

(56) References Cited

U.S. PATENT DOCUMENTS 3,796,871 A * 3/1974 Helmcke ................. G08G 1/075
 246/167 R
8,457,827 B1 * 6/2013 Ferguson .............. B60W 30/16
 701/28

(Continued)

OTHER PUBLICATIONS

Cunningham, Alexander G. et al., "MPDM: Multipolicy Decision-Making in Dynamic, Uncertain Environments for Autonomous Driving", 2015 IEEE International Conference on Robotics and Automation (ICRA), Jul. 2, 2015, DOI: 10.1109/ICRA.2015.7139412, 8pgs.

(Continued)

*Primary Examiner* — Jonathan M Dager
(74) *Attorney, Agent, or Firm* — Buckley, Maschoff & Talwalkar LLC

(57) ABSTRACT

Provided is a system and method that can control a merge of an autonomous vehicle when other vehicles are present on the road. In one example, the method may include iteratively estimating a series of values associated with one or more vehicles in an adjacent lane with respect to an ego vehicle, identifying a trend associated with the one or more vehicles from the iteratively estimated series of values, determining merge intentions of the one or more vehicles with respect to the ego vehicle based on the identified trend over time, verifying the merge intentions against a simulated change in the trend, selecting a merge position of the ego vehicle with respect to the one or more vehicles within the lane based on the verified merge intentions, and executing an instruction to cause the ego vehicle to perform a merge operation based on the selected merge position.

20 Claims, 11 Drawing Sheets

(51) Int. Cl.
*B60W 30/095* (2012.01)
*B60W 40/04* (2006.01)
*B60W 60/00* (2020.01)
*B60W 50/00* (2006.01)

(52) U.S. Cl.
CPC .............. *B60W 2050/0031* (2013.01); *B60W 2300/145* (2013.01); *B60W 2554/4041* (2020.02); *B60W 2554/4045* (2020.02); *B60W 2554/80* (2020.02); *B60W 2556/10* (2020.02)

(56) References Cited

U.S. PATENT DOCUMENTS

| | | | | |
|---|---|---|---|---|
| 8,788,134 | B1* | 7/2014 | Litkouhi | B60W 30/16 701/23 |
| 9,738,280 | B2* | 8/2017 | Rayes | B60W 30/143 |
| 9,934,688 | B2* | 4/2018 | Olson | B60W 30/08 |
| 9,969,430 | B2* | 5/2018 | Niemz | B60W 30/146 |
| 10,293,819 | B1* | 5/2019 | El-Khatib | B60W 30/10 |
| 10,403,161 | B1* | 9/2019 | Bry | G01S 13/933 |
| 10,620,633 | B2* | 4/2020 | Yamamoto | G05D 1/0212 |
| 10,688,997 | B2* | 6/2020 | Habu | B60W 10/18 |
| 10,902,725 | B2* | 1/2021 | Tanaka | B60W 40/04 |
| 10,906,558 | B1* | 2/2021 | Hwang | B60W 60/0027 |
| 11,117,584 | B2* | 9/2021 | D'sa | B60W 60/0011 |
| 11,247,677 | B2* | 2/2022 | Imai | B60W 30/095 |
| 11,275,379 | B2* | 3/2022 | Kizumi | G05D 1/0088 |
| 11,295,609 | B1* | 4/2022 | Tanaka | B60W 30/18163 |
| 11,400,934 | B2* | 8/2022 | Jalali | G08G 1/22 |
| 2009/0060647 | A1* | 3/2009 | Denison | E01C 1/02 404/1 |
| 2010/0191458 | A1* | 7/2010 | Baker | G06Q 10/04 705/40 |
| 2010/0211302 | A1* | 8/2010 | Ribbe | G08G 5/0039 701/120 |
| 2013/0099911 | A1* | 4/2013 | Mudalige | G08G 1/166 701/23 |
| 2014/0195093 | A1* | 7/2014 | Litkouhi | B60W 30/18163 701/23 |
| 2014/0358841 | A1* | 12/2014 | Ono | B60W 30/0956 706/52 |
| 2015/0100216 | A1* | 4/2015 | Rayes | G01S 13/867 701/96 |
| 2016/0068156 | A1* | 3/2016 | Horii | B60W 30/18163 701/28 |
| 2016/0339919 | A1* | 11/2016 | Habu | B60W 30/0956 |
| 2017/0031361 | A1* | 2/2017 | Olson | B60W 30/0956 |
| 2017/0076607 | A1* | 3/2017 | Linder | G08G 1/167 |
| 2017/0096139 | A1* | 4/2017 | Christensen | G08G 1/167 |
| 2017/0153639 | A1* | 6/2017 | Stein | G08G 1/167 |
| 2017/0287331 | A1* | 10/2017 | Laur | B62D 15/0285 |
| 2018/0052458 | A1* | 2/2018 | Tsuji | B60W 10/06 |
| 2018/0105186 | A1* | 4/2018 | Motomura | B60W 60/001 |
| 2018/0148036 | A1* | 5/2018 | Gaither | B60W 20/12 |
| 2018/0339708 | A1* | 11/2018 | Geller | B60L 3/0015 |
| 2019/0193737 | A1* | 6/2019 | Likhachev | G05D 1/0289 |
| 2019/0329778 | A1* | 10/2019 | D'sa | B62D 15/0255 |
| 2019/0329779 | A1* | 10/2019 | D'sa | G06N 20/20 |
| 2019/0367022 | A1* | 12/2019 | Zhao | B60W 30/18154 |
| 2020/0286386 | A1* | 9/2020 | Zhou | G08G 1/0116 |
| 2020/0348678 | A1* | 11/2020 | Sun | G06N 20/00 |
| 2021/0070302 | A1* | 3/2021 | Yu | B60W 30/16 |
| 2021/0256851 | A1* | 8/2021 | Uenoyama | G08G 1/096783 |
| 2021/0261162 | A1* | 8/2021 | Hiramatsu | B60W 40/04 |
| 2021/0370978 | A1* | 12/2021 | Molinari | B60W 30/18163 |
| 2021/0394797 | A1* | 12/2021 | Ran | B60W 60/0027 |
| 2022/0009493 | A1* | 1/2022 | Mizoguchi | B60W 30/0953 |
| 2022/0048513 | A1* | 2/2022 | Xu | B60W 60/00276 |
| 2022/0083065 | A1* | 3/2022 | Liu | G01C 21/26 |
| 2022/0292982 | A1* | 9/2022 | Brandin | G08G 1/20 |
| 2022/0348227 | A1* | 11/2022 | Foster | G06V 20/58 |
| 2022/0371595 | A1* | 11/2022 | Meuresch | G08G 1/167 |
| 2022/0379924 | A1* | 12/2022 | Foster | B60W 30/16 |
| 2023/0009173 | A1* | 1/2023 | Reshef | B60W 30/18163 |
| 2023/0094169 | A1* | 3/2023 | Kim | B60W 50/00 701/25 |

OTHER PUBLICATIONS

Galceran, Enric et al., "Multiply Decision-Making for Autonomous Driving via Changepoint-based Behavior Prediction", Robotics: Science and Systems, Jul. 2015, DOI: 10.15607/RSS.2015.XI.043, 10pgs.

Notice of Allowance dated Sep. 30, 2022 which was received in connection with U.S. Appl. No. 17/846,584.

* cited by examiner

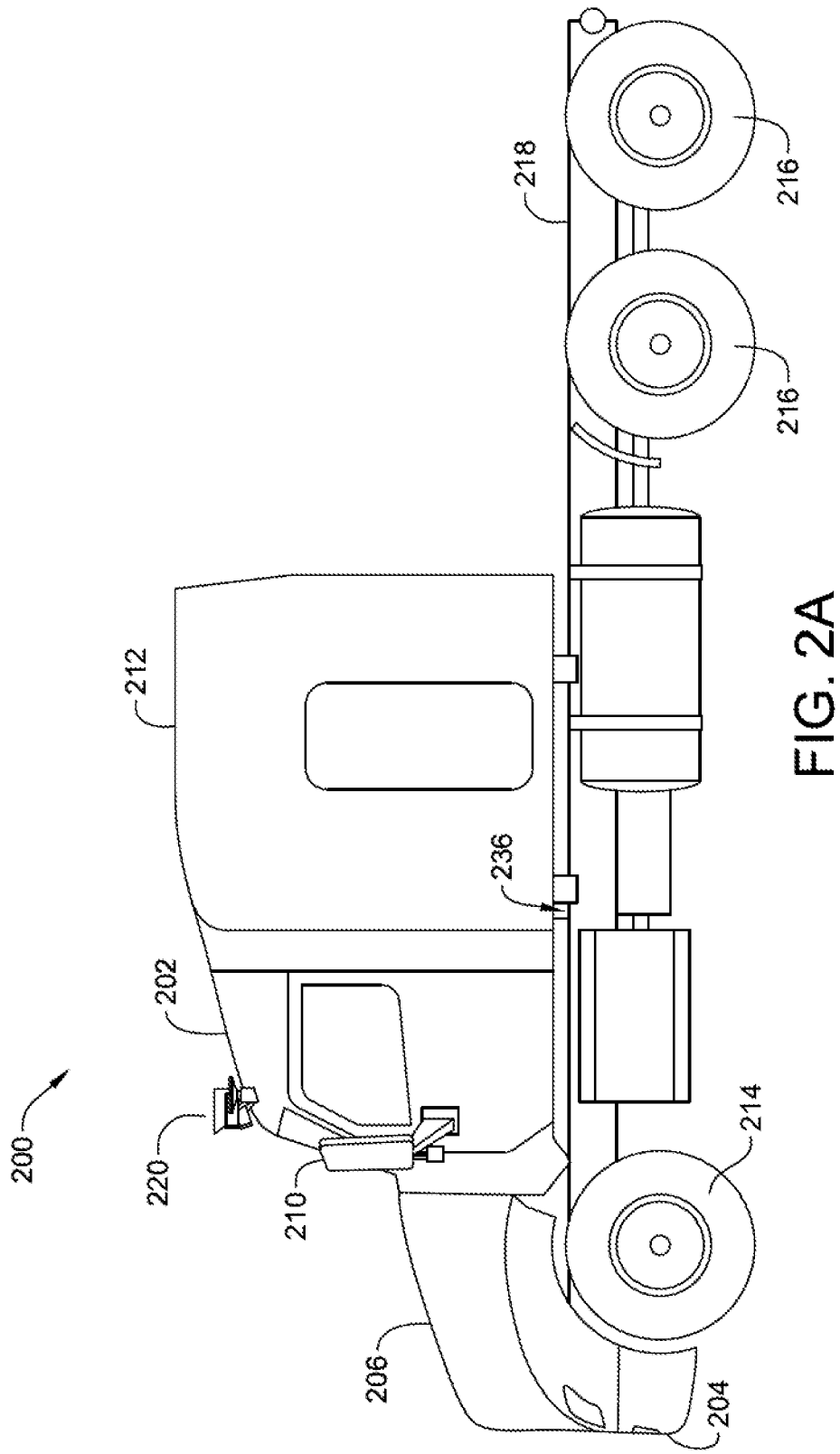

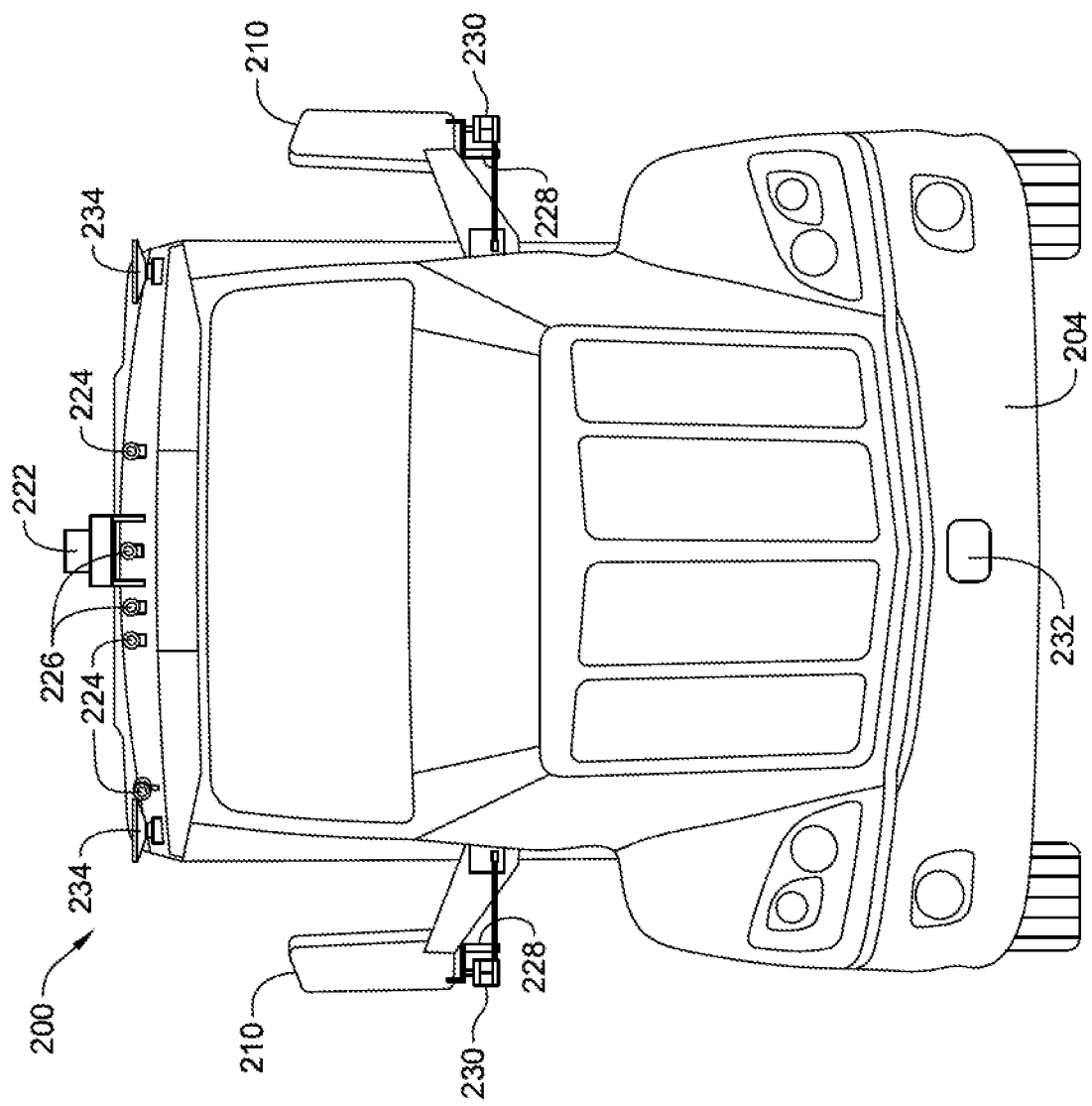

| Vehicle A 432 | |
|---|---|
| Speed | Profile |
| 32 mph | GO |
| 32 mph | GO |
| 31 mph | GO |
| 29 mph | YIELD |
| 27 mph | YIELD |
| 25 mph | GO |
| 25 mph | GO |
| 26 mph | GO |
| 27 mph | GO |
| 27 mph | GO |
| 29 mph | GO |
| 31 mph | GO |
| 31 mph | GO |

| Vehicle B 434 | |
|---|---|
| Speed | Profile |
| 31 mph | GO |
| 31 mph | GO |
| 30 mph | GO |
| 30 mph | YIELD |
| 29 mph | YIELD |
| 29 mph | GO |
| 28 mph | YIELD |
| 29 mph | GO |
| 30 mph | GO |
| 30 mph | GO |
| 31 mph | GO |
| 31 mph | GO |
| 32 mph | GO |

| Vehicle C 436 | |
|---|---|
| Speed | Profile |
| 32 mph | GO |
| 32 mph | GO |
| 31 mph | GO |
| 29 mph | YIELD |
| 27 mph | YIELD |
| 24 mph | YIELD |
| 23 mph | GO |
| 23 mph | YIELD |
| 22 mph | GO |
| 21 mph | YIELD |
| 22 mph | GO |
| 22 mph | GO |

| Vehicle D 438 | |
|---|---|
| Speed | Profile |
| 33 mph | GO |
| 32 mph | GO |
| 31 mph | YIELD |
| 28 mph | YIELD |
| 28 mph | YIELD |
| 27 mph | YIELD |
| 26 mph | YIELD |
| 24 mph | YIELD |
| 23 mph | YIELD |
| 22 mph | GO |
| 20 mph | GO |
| 20 mph | GO |
| 21 mph | GO |
| 21 mph | GO |

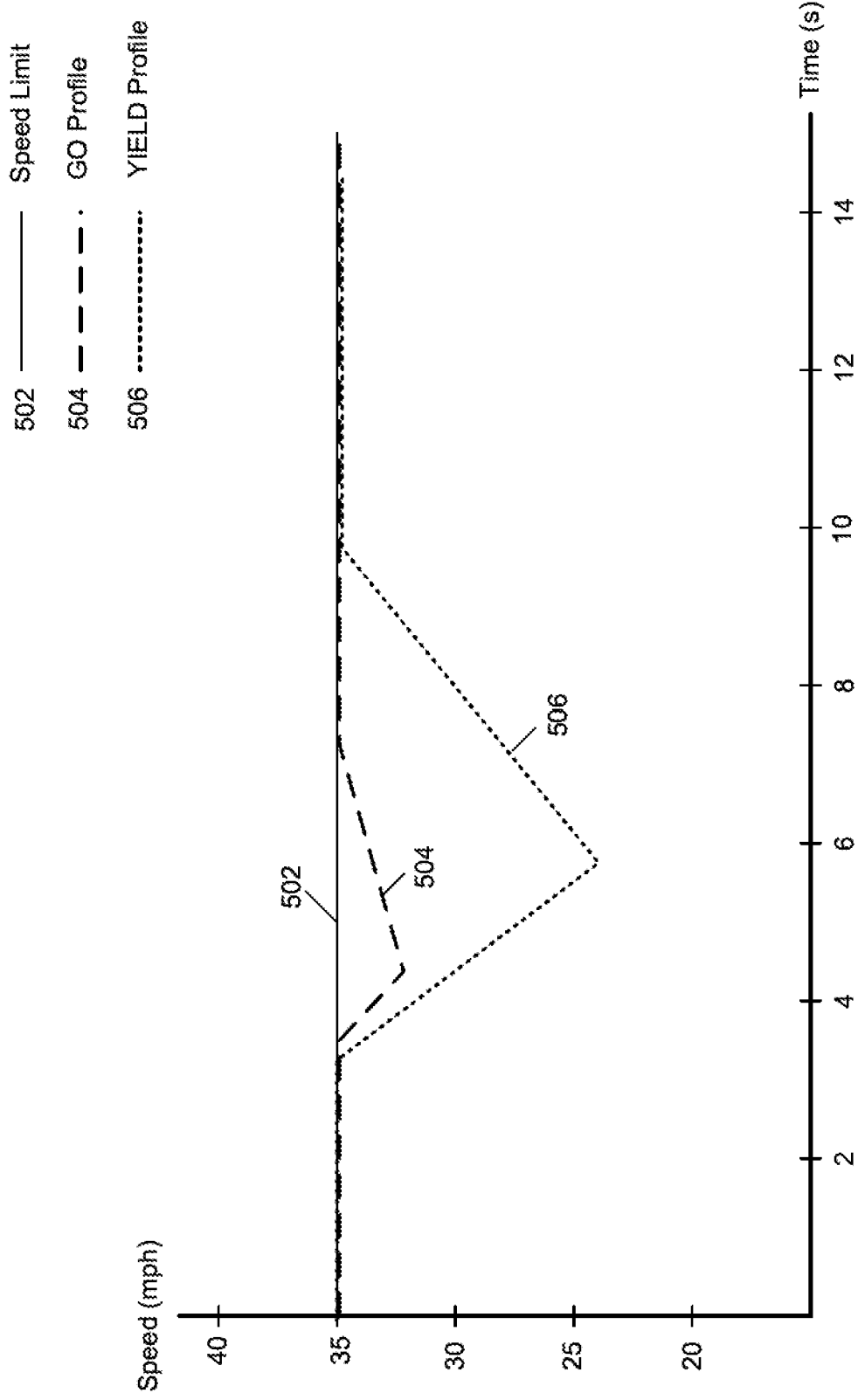

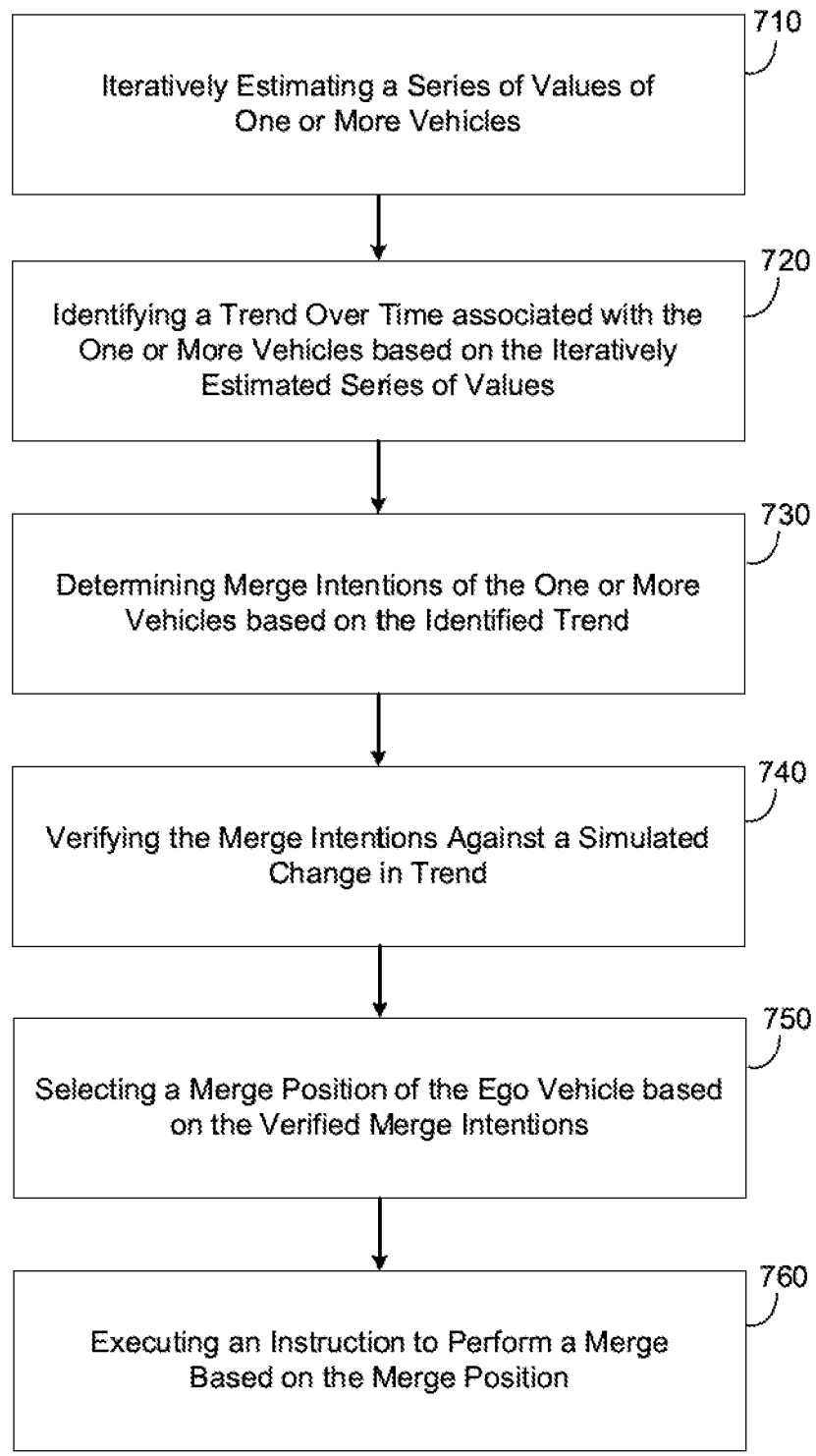

MERGE HANDLING BASED ON MERGE INTENTIONS OVER TIME

CROSS-REFERENCE TO RELATED APPLICATION(S)

The present application is a continuation of U.S. patent application Ser. No. 17/846,584, filed on Jun. 22, 2022, in the United States Patent and Trademark Office, the entire disclosure of which is hereby incorporated by reference for all purposes.

BACKGROUND

When an autonomous vehicle (i.e., self-driving vehicle) performs a merge operation, the process often involves interactions between vehicles such as slowing down to let someone enter the lane/road, or the like, but such interactions are hard to plan for with simple rules. For example, when simple rules are hardcoded in advance and used for a merge operation, an autonomous vehicle could perform an excessive amount of braking. In particular, the autonomous vehicle may err on the side of caution and slow down more than what is necessary to perform the merge operation. This is because the rules don't provide for analyzing the "intent" of other vehicles, e.g. instances where another vehicle may be slowing to permit a merge. Therefore a drawback from relying on simple rules is that other vehicles on the road are also unnecessarily slowed by this operation creating potential safety issues and other undesirable behavior. On the other hand, there are also instances where the autonomous vehicle does not slow down enough. This can occur when a car approaching from behind speeds up very quickly. In this case as well, an accident may occur or other vehicles on the road may be otherwise interfered with.

SUMMARY

The example embodiments are directed to an improved merge handling process for an autonomous vehicle (also referred to herein as an ego vehicle). In particular, the ego vehicle may continuously monitor and determine the merge intentions of other vehicles surrounding the ego vehicle (e.g., located within a predetermined distance of the ego vehicle such as 200 m, 300 m, etc.) The ego vehicle may use a digital map to determine which vehicles surrounding the ego vehicle are relevant for the computation. The predetermined distance may be determined based on sensor data from the road. The ego vehicle may iteratively determine the merge intentions in rather short intervals (e.g., 10 times a second, 15 times a second, etc.) thereby quickly building a merge profile of the other vehicles that can be used to make a merge decision based on conditions at or near the point of the merge rather than rules that dictate merge operations well ahead of time.

The merge intentions may be identified from a plurality of speed profiles that include a go profile and a yield profile. The merge intentions of a vehicle may change over time. Both the go profile and the yield profile may be analyzed at each iteration of the operation by comparing the go profile and the yield profile against current data. Furthermore, the go profile and the yield profile may be interpreted depending on a current situation of the ego vehicle and the surrounding vehicles. For example, if the current behavior predicts a merge intention of "go" or "yield", the system may also verify that there is sufficient reaction time for the adjacent vehicle to change its behavior in response to ego's action. If this change in behavior requires only minor changes in speed and happens well in advance of a potential conflict region, then the ego vehicle can perform a more assertive action, until reassessment of the situation shortly thereafter. The accumulation of such merge intentions can be used by the ego vehicle to determine a merge position with respect to the vehicle. For example, if the ego vehicle detects a first vehicle slightly behind the ego vehicle is in a go profile while a second vehicle further behind the ego vehicle is in a yield react profile, the ego vehicle may decide to merge between the first and second vehicles.

According to an aspect of an example embodiment, provided is an apparatus that may include a processor that may iteratively estimate a value (e.g. speed value) of one or more vehicles traveling in an adjacent lane with respect to an ego vehicle, predict merge intentions of the one or more vehicles with respect to the ego vehicle based on the iteratively estimated speed value over time, determine a merge position of the ego vehicle with respect to the one or more vehicles within the lane based on the predicted merge intentions, and execute an instruction to cause the ego vehicle to perform a merge operation based on the determined position.

According to an aspect of another example embodiment, provided is a method that may include iteratively estimating a speed value of one or more vehicles traveling in an adjacent lane with respect to an ego vehicle, predicting merge intentions of the one or more vehicles with respect to the ego vehicle based on the iteratively estimated speed value over time, determining a merge position of the ego vehicle with respect to the one or more vehicles within the lane based on the predicted merge intentions, and executing an instruction to cause the ego vehicle to perform a merge operation based on the determined position.

According to an aspect of another example embodiment, provided is a non-transitory computer-readable medium with instructions which when executed by a processor cause a computer to perform a method that may include iteratively estimating a speed value of one or more vehicles traveling in an adjacent lane with respect to an ego vehicle, predicting merge intentions of the one or more vehicles with respect to the ego vehicle based on the iteratively estimated speed value over time, determining a merge position of the ego vehicle with respect to the one or more vehicles within the lane based on the predicted merge intentions, and executing an instruction to cause the ego vehicle to perform a merge operation based on the determined position.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

FIGS. 2A-2C are diagrams illustrating exterior views of a semi-truck that may be used in accordance with example embodiments.

FIG. 4B is a diagram illustrating a storage structure storing merge profiles of a plurality of vehicles over time in accordance with example embodiments.

FIG. 5 is a diagram illustrating examples of speed profiles that can be used to determine merge intentions in accordance with example embodiments.

FIG. 7 is a diagram illustrating a method of executing a merge operation based on merge intentions of other vehicles over time in accordance with an example embodiment.

Figure 1:
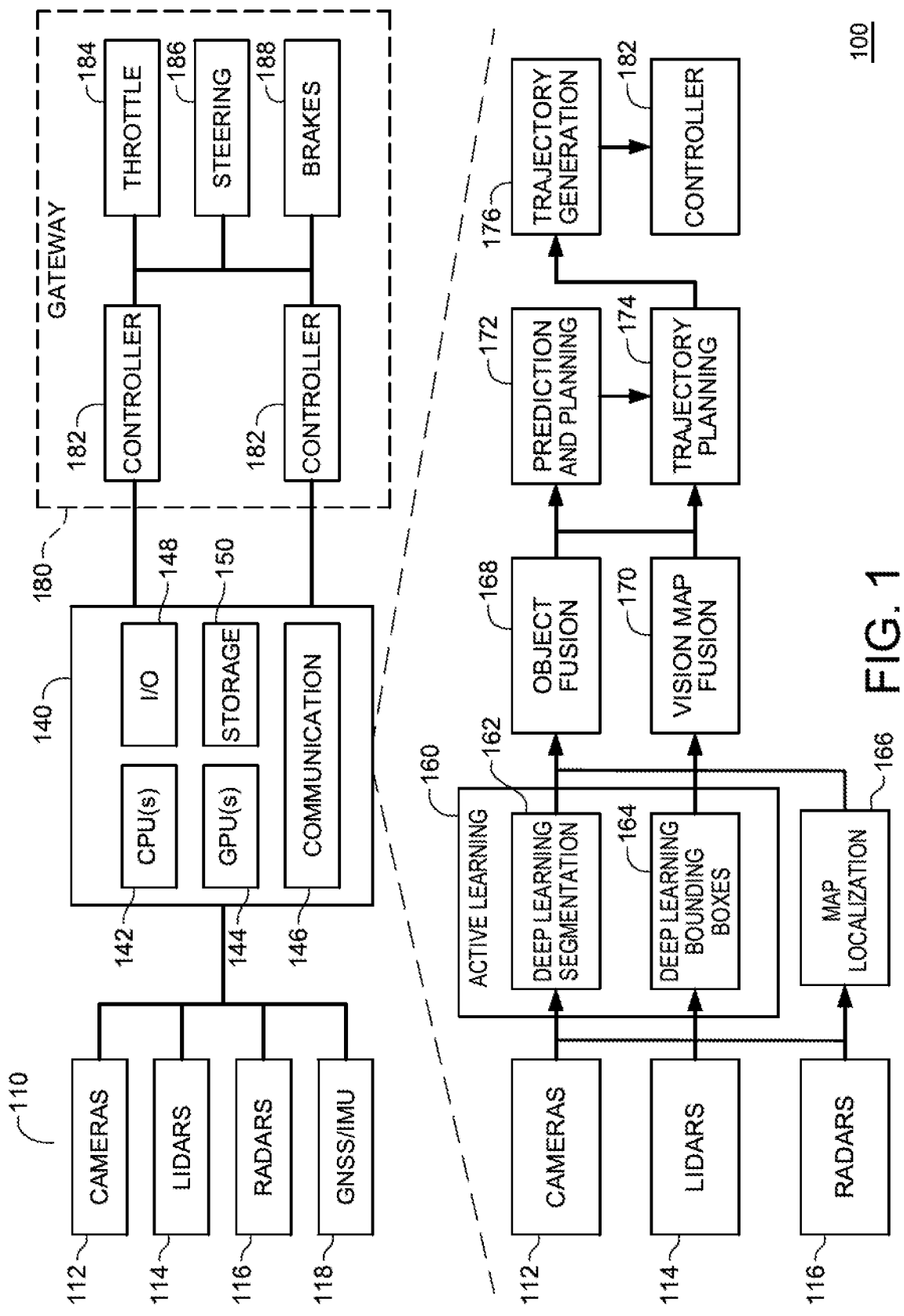
FIG. 1 is a diagram illustrating a control system that may be deployed in a vehicle such as the semi-truck depicted in FIGS. 2A-2C, in accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

For convenience and ease of exposition, a number of terms will be used herein. For example, the term "semi-truck" will be used to refer to a vehicle in which systems of the example embodiments may be used. The terms "semi-truck", "truck", "tractor", "vehicle" and "semi" may be used interchangeably herein.

Light detection and ranging (lidar) sensors are used by vehicles to measure a surrounding area by obtaining a sparse point cloud using distances to points in the point cloud that are measured by light beams from the lidar sensors. The illumination works independently from ambient light and can be used in any conditions. Furthermore, the lidar sensors can capture data that can be used to generate a map of the world in three-dimensions (3D). Meanwhile, vehicle cameras can capture images (e.g., RGB images, black and white images, etc.) of the world around the vehicle and provide complimentary data to the lidar data captured by the lidar sensors. For example, cameras can capture data such as color, texture, appearance, etc., while lidar is able to capture and model structural aspects of the data.

In many vehicles, the perception of the vehicle is created based on a combination (i.e., jointly) of lidar data from the lidar sensors and image data captured by the cameras. For accurate perception, these two systems must be aligned with respect to each other. Calibration can be performed to align a coordinate frame of a lidar sensor(s) with a coordinate frame of a camera by changing extrinsic parameters such as rotation and translation between the coordinate frames of the lidar sensor and the camera. These extrinsic parameters can be used to fuse information together from the lidar sensors and the image sensors when visualizing the vehicle interprets visual data from the road.

With the calibrated sensors, the vehicle can capture images and lidar readings of the area surrounding the vehicle and build/modify a three-dimensional map that is stored internally within a computer of the vehicle (or remotely via a web server). The vehicle can localize itself within the map and make decisions on how to steer, turn, slow down, etc. based on other objects, lane lines, entrance lanes, exit lanes, etc. within the map. Autonomous vehicles may use one or more computer systems to control the vehicle to move autonomously without user input. For example, the vehicle may be equipped with an autonomous vehicle (AV) system that generates signals for controlling the engine, the steering wheel, the brakes, and the like, based on other objects, lane lines, entrance lanes, and exit lanes, within the map.

According to various embodiments, a merge operation of an ego vehicle may be performed by estimating merge intentions of other vehicles adjacent to the ego vehicle over time and determining a merge position accordingly. The merge position may be selected from among a plurality of gaps between a plurality of other vehicles in the merging lane. The estimate merge intentions may be updated repeatedly (e.g., 10 times a second for 5 seconds, etc.) and likewise, the estimated merge position may also be updated repeatedly. At some point prior to the merge operation, for example, based on an amount of distance to a vehicle in front, etc., the ego vehicle may stop performing the merge position estimate and select a final merge position (i.e. a gap) which may be located in between two vehicles traveling in an adjacent lane. By using a merge profile of other vehicles developed over a period of time (e.g., a few seconds, etc.), the ego vehicle may obtain a better understanding of the intentions of the other vehicles and at a point in time that is closer to the merge operation being performed in comparison to related methods. As a result, the ego vehicle may spend less time braking during a merge operation and choose a more intelligent merge position than in comparison to related method. In some embodiments herein, steps are described as being performed by an "ego" vehicle. However, it should be appreciated that some or all of these steps may be performed by a remote server that is electrically communicating with the ego vehicle.

For example, an ego vehicle, such as an autonomous vehicle, may capture a series of data points (e.g., iteratively, etc.) of the other surrounding vehicles that are participating in a merge operation up until a merge point or "critical" line which defines the ordering of how vehicles will merge (i.e., in what order they pass the critical line). As an example, the ego vehicle may capture ten readings per second for four seconds of multiple vehicles in an adjacent lane (merging lane) and in its own lane (e.g., in front and behind) resulting in forty readings being captured for each of these other vehicles prior to the merge operation. Also, the window may be a moving or sliding window where the system only considers the last few seconds of data, while discarding data that is older (e.g., older than four seconds, etc.)

This enables the ego vehicle to identify the current "trends" of the merge intentions of other vehicles surrounding the ego vehicle. In other words, rather than simulate the scene forward based on a single data capture and using such a simulation to make the merge decision, the ego vehicle of the present application may iteratively capture data from the surrounding vehicles and estimate merge intentions up until a critical point before the merge operation (e.g., based on a safe following distance from the vehicle in front of the ego vehicle, etc.) and make a merge decision based on respective merge intention "trends" of other vehicles which are identified from the aggregation of data captured over the window of time.

To do this, the system (e.g., software installed inside a computer of the ego vehicle, etc.) described herein may iteratively simulate the actions of other vehicles surrounding the ego vehicle based on a simulated future intentions/trends of leading vehicles with respect to the other vehicles. The simulation may be used by the system to determine merge intentions of the other vehicles including a "go" intention and a "yield" intention. Furthermore, the simulations may be used to verify predicted merge intentions of the other vehicles. As an example, the system may compare the predicted merge intention of a vehicle against a REACT profile to verify that the predicted merge intention of the vehicle will allow for enough time for the vehicle to change its action, after a reaction time, to allow ego to slot into a gap.

The "go" intention indicates that the other vehicle is keeping a suitable distance to the vehicle in front of it and does not want to slow down to allow another vehicle in between itself and the leading vehicle. To determine a go intention, the system may look at the current state of the world and have a simple control law/ODE for how to maintain a suitable distance. As another option, the system may look at the future state of a leader vehicle as well.

The "yield" intention indicates the other vehicle wants to yield to allow an adjacent vehicle (i.e., in an adjacent lane with respect to the other vehicle) to merge in front. The system can solve for an acceleration/control action to go behind the vehicle at a future time. The system can use an optimal control formulation to plan for the other vehicle. As an example, the system may use a rule to compute the acceleration (depending on the assumed known future trajectory of the vehicle it is going behind).

Next, the system may use these simulated intentions over time of the other surrounding vehicles to determine a merge plan for the ego vehicle. In this case, the system may check how different the situation would become if the ego vehicle chooses to slot into different specific gaps in between the other vehicles participating in the merge. This is done by generating a plan by solving for each gap the ego vehicle could slot into, then solving the same problem for a follower of the ego vehicle for each such gap. The system assumes an ordering of who-follows-who and for each of these planning problems assume the future trajectories of the vehicles that the other vehicle needs to go behind. The planning problem may include simulating the longitudinal dynamics of the follower. In particular, the system may plan/simulate the sequence of actions of each surrounding vehicle. Here, the system may perform the simulation assuming the trajectory for its leaders are known. In some embodiments, the system may perform multiple such evaluations such as one for each gap for the ego vehicle and once for each follower of the ego vehicle.

The system may also use a "cost function" to determine which gap is appropriate for the ego vehicle based on the trends of the merge intentions of the other vehicles. For example, the system may look at the sum of squared speed loss for two vehicles in the gap: (e.g., how much does the ego vehicle have to slow down compared to going first? How much does ego's new follower have to slow down compared to following its lead vehicle, if this is unexpected?) The result, is a tailored approach to a merging/slotting into a gap based on a trend/pattern of merge intentions of other vehicles. In some cases, the system may ignore some of the simulations/plans as irrelevant when looking at the outcome. The system may then use an L1 smoothing technique to determine which intention is most likely.

In addition, the system may compute two plans for a following vehicle in each gap: plan-yield and plan-yield-react (regardless of the estimated likelihood of different intentions). This allows the system to check the following scenario: what happens if the vehicle first keeps attempting an overtake, does it have time to react and abort the overtake, how much speed loss would that incur, and the like.

Next the system may assume the vehicle will perform its most likely plan. For example, a plan of yield may be determined/assumed for the yield intention and a plan of yield-react for the go intention. Then, the system may use the estimated most likely intention to score the gap. If the vehicle is detected to yield then the cost of it slowing is low (e.g., almost zero, etc.) The rationale here is that the system has determined that this driver understands what is going on and is actively accommodating the ego vehicle. Next, the system may compare the assumed plan with the estimated trend from L1 smoothing. Here, the system may not consider the REACT plan. The L1 smoothing produces a trend (change of speed) that can be identified and used to figure out what the current scenario is around the vehicle.

The system may also execute an algorithm that tries to analyze the trends of merge intentions of the other vehicles to determine which vehicles are accommodating the ego vehicle and/or would be minimally disturbed by the planned action. The system may also consider how much the ego vehicle has to brake, taking into account a reaction time. The ego vehicle's reaction time may be a shorter amount of time than the other vehicles and may provide some hysteresis (e.g., a change of plan is not modeled as instant but taking a little while, etc.) which may provide a slight edge to plans that do not change cycle to cycle, making it a bit more likely to stick with the old plan (gap to merge into), rather than to switch gaps back and forth given a close tie in costs. The system described herein can perform this process as a safety check. At a high level, the system may analyze whether the ego vehicle is acting in a way that corresponds to how a merging vehicle would expect.

The system may also check if a vehicle that is currently assumed to have a yield intention has enough time to change its action to a go intention (e.g., change the plan to go-react). The estimated likelihood of the lead vehicle's intention may be used by the system to determine which of these scenarios is checked.

According to various embodiments, the method and system may produce an action plan that is actuated upon for a short time before being run again. The method and system may determine merge intentions of multiple vehicles in an adjacent lane. It is possible for the method and system to determine merge intentions of other vehicles in the same lane as the ego vehicle, however, in other embodiments, the merge intentions are only determined for vehicles in the adjacent lane.

Some of the benefits of the example embodiments include planning and simulating a merge intention of multiple vehicles involved in a merge operation including following vehicles and leading vehicles of both lanes being merged. The system may also check the REACT plans to analyze available reaction time for the vehicles. Furthermore, L1 smoothing may be performed to estimate trends (e.g., changes of speed/intention) of the respective vehicles and compare the trends to current plans to see which plans are most optimal for the current situation.

Figure 2C:
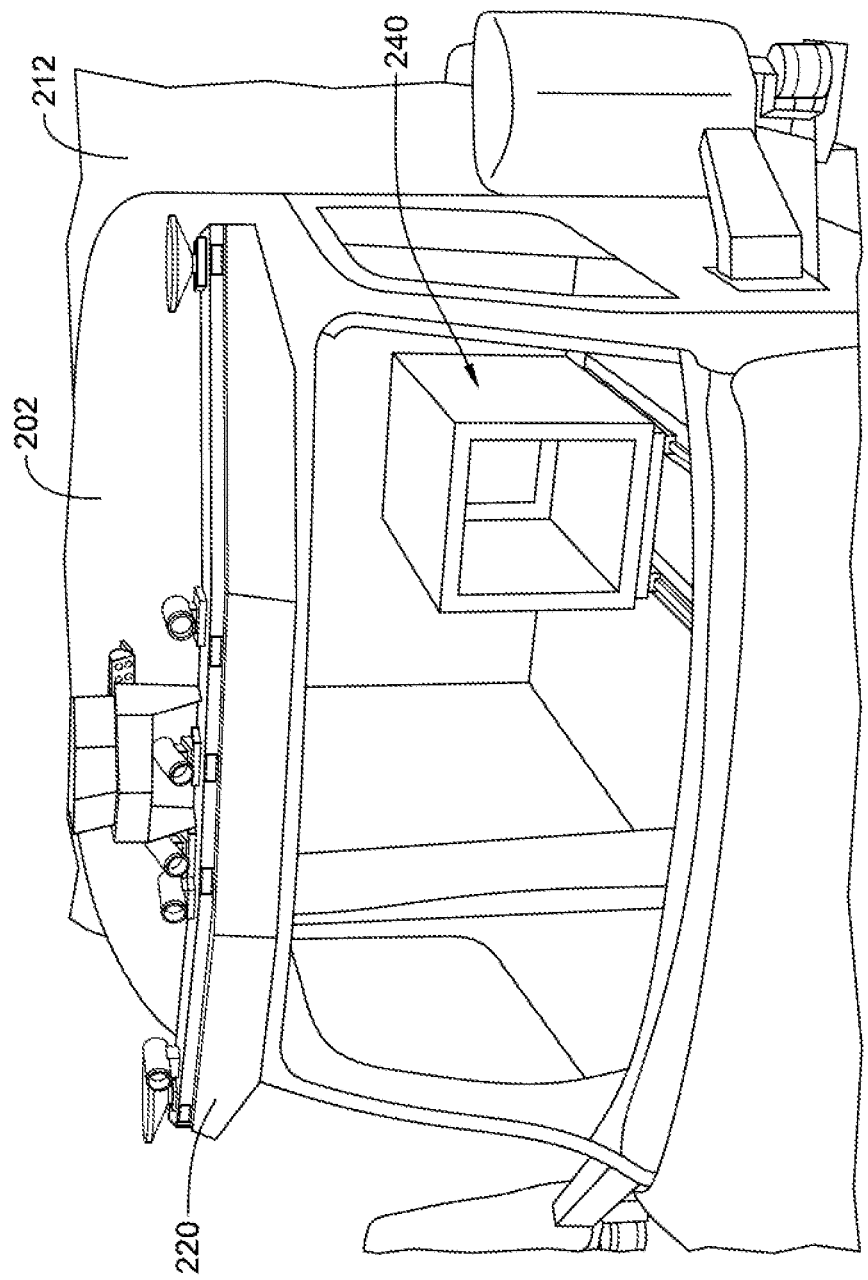

FIG. 1 illustrates a control system 100 that may be deployed in a vehicle such as the semi-truck 200 depicted in FIGS. 2A-2C, in accordance with an example embodiment. In some embodiments, the vehicle may be referred to as an ego vehicle. Referring to FIG. 1, the control system 100 may include a number of sensors 110 which collect data and information provided to a computer system 140 to perform operations including, for example, control operations which control components of the vehicle via a gateway 180. Pursuant to some embodiments, the gateway 180 is configured to allow the computer system 140 to control a number of different components from different manufacturers.

The computer system 140 may be configured with one or more central processing units (CPUs) 142 to perform processing including processing to implement features of embodiments of the present invention as described elsewhere herein as well as to receive sensor data from sensors 110 for use in generating control signals to control one or more actuators or other controllers associated with systems of the vehicle (including, for example, actuators or controllers allowing control of a throttle 184, steering systems 186, brakes 188 or the like). In general, the control system 100 may be configured to operate the semi-truck 00 in an autonomous (or semi-autonomous) mode of operation.

In operation, the control system 100 may be operated to capture images from one or more cameras 112 mounted on various locations of the semi-truck 200 and perform processing (such as image processing) on those images to identify objects proximate or in a path of the semi-truck 200. Further, lidar 114 and radar 116 sensors may be positioned to sense or detect the presence and volume of objects proximate or in the path of the semi-truck 200. Other sensors may also be positioned or mounted on various locations of the semi-truck 200 to capture other information such as position data. For example, the sensors may include one or more satellite positioning sensors and/or inertial navigation systems such as GNSS/IMU 118. A Global Navigation Satellite System (GNSS) is a space-based system of satellites that provide the location information (longitude, latitude, altitude) and time information in all weather conditions, anywhere on or near the Earth to devices called GNSS receivers. GPS is the world's most used GNSS system. An inertial measurement unit ("IMU") is an inertial navigation system. In general, an inertial navigation system ("INS") measures and integrates orientation, position, velocities, and accelerations of a moving object. An INS integrates the measured data, where a GNSS is used as a correction to the integration error of the INS orientation calculation. Any number of different types of GNSS/IMU 118 sensors may be used in conjunction with features of the present invention. The data collected by each of these sensors may be processed by the computer system 140 to generate control signals that control the operation of the semi-truck 200. The images and location information may be processed to identify or detect objects around or in the path of the semi-truck 200 and control signals may be emitted to adjust the throttle 184, steering 186 or brakes 188 as needed to operate the semi-truck 200. While illustrative example sensors and actuators or vehicle systems are shown in FIG. 1, those skilled in the art, upon reading the present disclosure, will appreciate that other sensors, actuators or systems may also be used. For example, in some embodiments, actuators to allow control of the transmission of the semi-truck 200 may also be provided.

The control system 100 may include a computer system 140 (such as a computer server) which is configured to provide a computing environment in which one or more software or control applications (such as items 160-182) may be executed to perform the processing described herein. In some embodiments, the computer system 140 includes components which are deployed on a semi-truck 200 (e.g., they may be deployed in a systems rack 240 positioned within a sleeper compartment 212 as shown in FIG. 2C). The computer system 140 may be in communication with other computer systems (not shown) that may be remote from the semi-truck 200 (e.g., the computer systems may be in communication via a network connection).

In some examples, the computer system 140 may be implemented as a server. Furthermore, the computer system 140 may configured using any of a number of well-known computing systems, environments, and/or configurations such as, but not limited to, personal computer systems, cloud platforms, server computer systems, thin clients, thick clients, hand-held or laptop devices, tablets, smart phones, databases, multiprocessor systems, microprocessor-based systems, set top boxes, programmable consumer electronics, network PCs, minicomputer systems, mainframe computer systems, distributed cloud computing environments, and the like, which may include any of the above systems or devices, and the like.

A number of different software applications or components may be executed by the computer system 140 and the control system 100. For example, as shown, applications may be provided which perform active learning machine processing (active learning component 160) to process images captured by one or more cameras 112 and information obtained by lidar 114. For example, image data may be processed using deep learning segmentation models 162 to identify objects of interest in those images (such as, for example, other vehicles, construction signs, etc.). Lidar data may be processed by the machine learning applications 164 to draw or identify bounding boxes on image data to identify objects of interest located by the lidar sensors. Information output from the machine learning applications may be provided as inputs to object fusion 168 and vision map fusion 170 software components which may perform processing to predict the actions of other road users and to fuse local vehicle poses with global map geometry in real-time, enabling on-the-fly map corrections. The outputs from the machine learning applications may be supplemented with information from radars 116 and map localization 166 application data (as well as with positioning data). These applications allow the control system 100 to be less map reliant and more capable of handling a constantly changing road environment. Further, by correcting any map errors on the fly, the control system 100 can facilitate safer, more scalable and more efficient operations as compared to alternative map-centric approaches. Information is provided to prediction and planning application 172 which provides input to trajectory planning 174 components allowing a trajectory 176 to be generated in real time based on interactions and predicted interactions between the semi-truck 200 and other relevant vehicles in the environment. In some embodiments, for example, the control system 100 generates a sixty second planning horizon, analyzing relevant actors and available trajectories. The plan that best fits multiple criteria (including safety, comfort and route preferences) is selected and any relevant control inputs needed to implement the plan are provided to controllers 182 to control the movement of the semi-truck 200.

These applications or components (as well as other components or flows described herein) may be implemented in hardware, in a computer program executed by a processor, in firmware, or in a combination of the above. A computer program may be embodied on a computer readable medium, such as a storage medium or storage device. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

A storage medium may be coupled to the processor such that the processor may read information from, and write information to, the storage medium. In an alternative, the storage medium may be integral to the processor. The processor and the storage medium may reside in an application specific integrated circuit ("ASIC"). In an alternative, the processor and the storage medium may reside as discrete components. For example, FIG. 1 illustrates an example computer system 140 which may represent or be integrated in any of the above-described components, etc. FIG. 1 is not intended to suggest any limitation as to the scope of use or functionality of embodiments of the application described herein. The computer system 140 is capable of being implemented and/or performing any of the functionality set forth hereinabove.

The computer system 140 may be described in the general context of computer system-executable instructions, such as program modules, being executed by a computer system. Generally, program modules may include routines, programs, objects, components, logic, data structures, and so on that perform particular tasks or implement particular abstract data types. The computer system 140 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer system 140 is shown in the form of a general-purpose computing device. The components of the computer system 140 may include, but are not limited to, one or more processors (such as CPUs 142 and GPUs 144), a communication interface 146, one or more input/output interfaces 148 and the storage device 216. Although not shown, the computer system 140 may also include a system bus that couples various system components including system memory to the CPUs 142. In some embodiments, the input/output interfaces 148 may also include a network interface. For example, in some embodiments, some or all of the components of the control system 100 may be in communication via a controller area network ("CAN") bus or the like.

The storage device 150 may include a variety of types and forms of computer readable media. Such media may be any available media that is accessible by computer system/server, and it may include both volatile and non-volatile media, removable and non-removable media. System memory, in one embodiment, implements the flow diagrams of the other figures. The system memory can include computer system readable media in the form of volatile memory, such as random-access memory (RAM) and/or cache memory. As another example, storage device 150 can read and write to a non-removable, non-volatile magnetic media (not shown and typically called a "hard drive"). Although not shown, the storage device 150 may include one or more removable non-volatile disk drives such as magnetic, tape or optical disk drives. In such instances, each can be connected to the bus by one or more data media interfaces. Storage device 150 may include at least one program product having a set (e.g., at least one) of program modules that are configured to carry out the functions of various embodiments of the application.

FIGS. 2A-2C are diagrams illustrating exterior views of a semi-truck 200 that may be used in accordance with example embodiments. Referring to FIGS. 2A-2C, the semi-truck 200 is shown for illustrative purposes only—those skilled in the art, upon reading the present disclosure, will appreciate that embodiments may be used in conjunction with a number of different types of vehicles. The example semi-truck 200 shown in FIGS. 2A-2C is one configured in a common North American style which has an engine 206 forward of a cab 202, a steering axle 214 and drive axles 216. A trailer (not shown) is attached to the semi-truck 200 via a fifth-wheel trailer coupling that is provided on a frame 218 positioned over the drive axles 216. A sleeper compartment 212 is positioned behind the cab 202. A number of sensors are positioned on different locations of the semi-truck 200. For example, sensors may be mounted on a roof of the cab 202 on a sensor rack 220. Sensors may also be mounted on side mirrors 210 as well as other locations. As will be discussed, sensors may be mounted on the bumper 204 as well as on the side of the cab 202 or other locations. For example, a rear facing radar 236 is shown as mounted on a side of the cab 202 in FIG. 2A. Embodiments may be used with other configurations of trucks or other vehicles (e.g., such as semi-trucks having a cab over or cab forward configuration or the like). In general, and without limiting embodiments of the present invention, features of the present invention may be used with desirable results in vehicles that carry cargo over long distances, such as long-haul semi-truck routes.

FIG. 2B is a front view of the semi-truck 200 and illustrates a number of sensors and sensor locations. The sensor rack 220 may secure and position several sensors including a long range lidar 222, long range cameras 224, GPS antennas 234, and mid-range front facing cameras 226. The side mirrors 210 may provide mounting locations for rear-facing cameras 228 and mid-range lidar 230. A front radar 232 may be mounted on the bumper 204. Other sensors may be mounted or installed on other locations—the locations and mounts depicted in FIGS. 2A-2C are for illustrative purposes only. Referring now to FIG. 2C, a partial view of the semi-truck 200 is shown which shows an interior of the cab 202 and the sleeper compartment 212. In some embodiments, portions of the control system 100 of FIG. 1 are deployed in a systems rack 240 in the sleeper compartment 212, allowing easy access to components of the control system 100 for maintenance and operation.

In the examples further described herein, the control system 100 in the example of FIG. 1 may be embodied within an ego vehicle such as the semi-truck 200 shown and described with respect to FIGS. 2A-2C. In these examples, the ego vehicle can use the sensors and other systems of the vehicle to detect the presence of another vehicle on a shoulder of a road while the ego vehicle is traveling along the road and approaching the ego vehicle. The ego vehicle may use a piecewise linear function to change speeds in short segments rather than using a constant change of speed. Furthermore, the ego vehicle may determine whether or not to perform a lane change (e.g., to a lane on an opposite side of the ego vehicle with respect to the shoulder). Whether such a lane change is made may be a dynamic decision made by the ego vehicle's computer as the ego vehicle is approaching the vehicle on the shoulder.

According to various embodiments, a merge handling process is described herein which can determine a merge position for an ego vehicle, such as a semi-truck, based on merge intentions of other vehicles that are performing the merge operation with the ego vehicle. In particular, the merge intentions of the other vehicles can be iteratively determined over short intervals of time (e.g., determine a merge intention every 0.1 seconds for four seconds, etc.) For example, the ego vehicle may include a buffer of previously-captured data (e.g., the previous four seconds, etc.) The contents of the buffer may be used to update the merge intention of the other vehicles. Each new iteration of the merge intention estimation updates the buffer. For example, new sensor data captured at each iteration is used to update the buffer and remove old data from the buffer keeping the buffer current (i.e., only the previous four seconds of data, etc.) thereby preventing the predictions from being biased as a result of outdated speed information.

Merge intentions may be determined based on models that receive sensor data of the motion of other vehicles (e.g., speed, acceleration, deceleration, location, etc.) captured by the ego vehicle and compare the sensed data to profiles such as speed profiles. The profiles include a "go" profile and a "yield" profile. The profiles may be dynamically determined and even updated based on currently measured conditions of the ego vehicle and the surrounding vehicles. The go profile may be a current speed limit with a dip in speed that is not as dramatic as the yield profile. For example, the ego vehicle may model both a go profile and yield profile for an adjacent vehicle and simulate forward the process based on the currently measured sensor data/conditions of the ego vehicle and the adjacent vehicle (as well as other adjacent vehicles). The speed profiles may be based off of a yield speed. The yield speed may be dynamically determined by the ego vehicle using a predefined equation. The yield speed may be dynamic because it may differ based on a speed of the ego vehicle, the speed of other vehicles, distances in between the other vehicles, etc. Using the yield profile and an unchanging speed or go profile, other intermediate profiles such as "go-react" and "yield-react" can be obtained. It should also be appreciated that other amounts of intermediate profiles may be obtained with different speeds.

The ego vehicle may use the speed and other data sensed of the other vehicles over time to build a merge profile of the other vehicles which includes different iterations of merge intentions and/or sensor data. In the examples herein, the merge profiles may include speed, acceleration, deceleration, location, etc. of the other vehicles that are iteratively sensed over time. This information can then be compared to the speed models to determine and verify which profile the other vehicles are following. As the other vehicles change their behavior while approaching the merge, the predicted merge intentions of the other vehicles may also change. By waiting and accumulating data over time and prior to the merge, the ego vehicle can make a better decision and on which gap to merge into and verify the decision against a simulation of the scene forward.

Figure 3A:
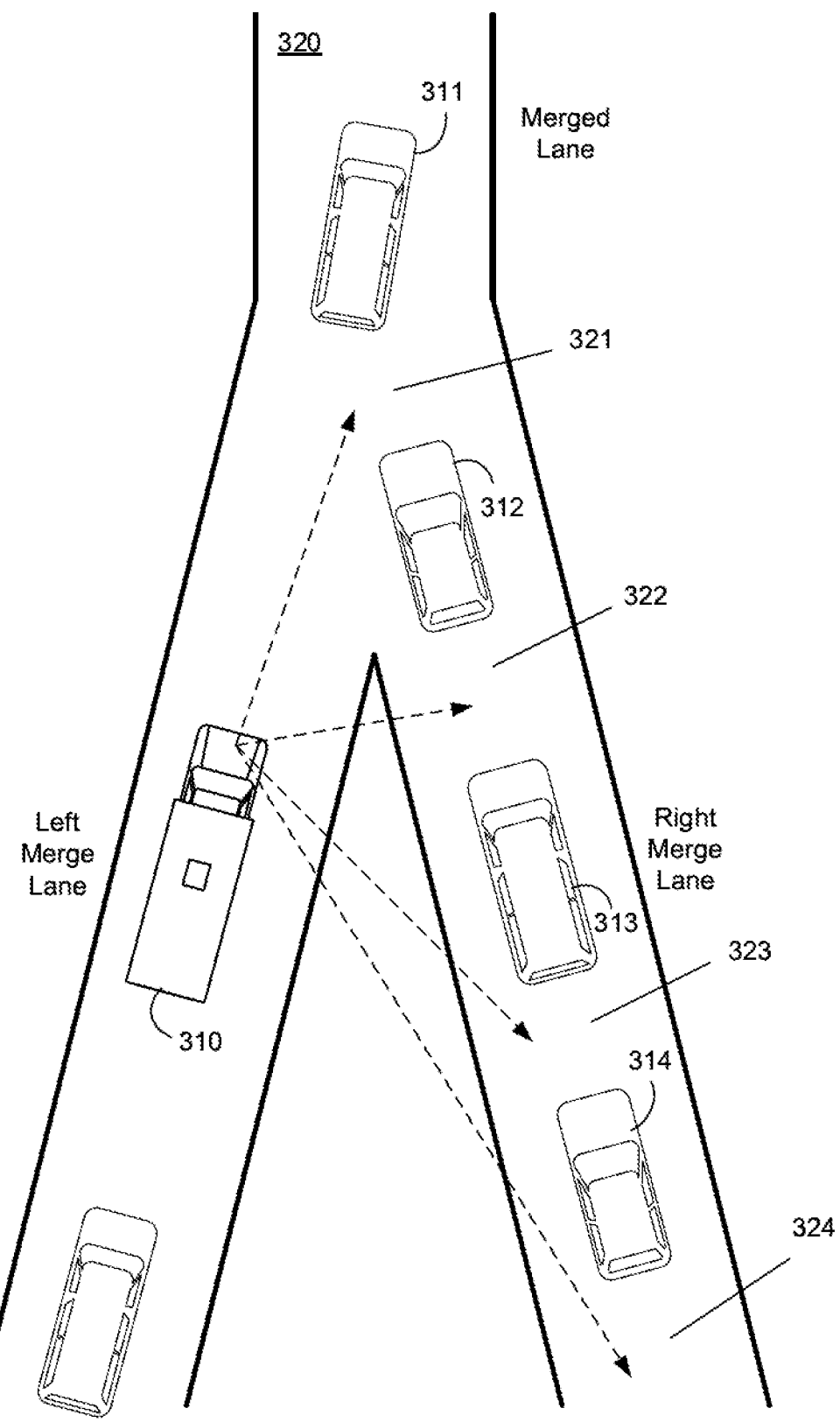
FIGS. 3A-3B are diagrams illustrating a merge operation of an ego vehicle in accordance with example embodiments.
Figure 3B:
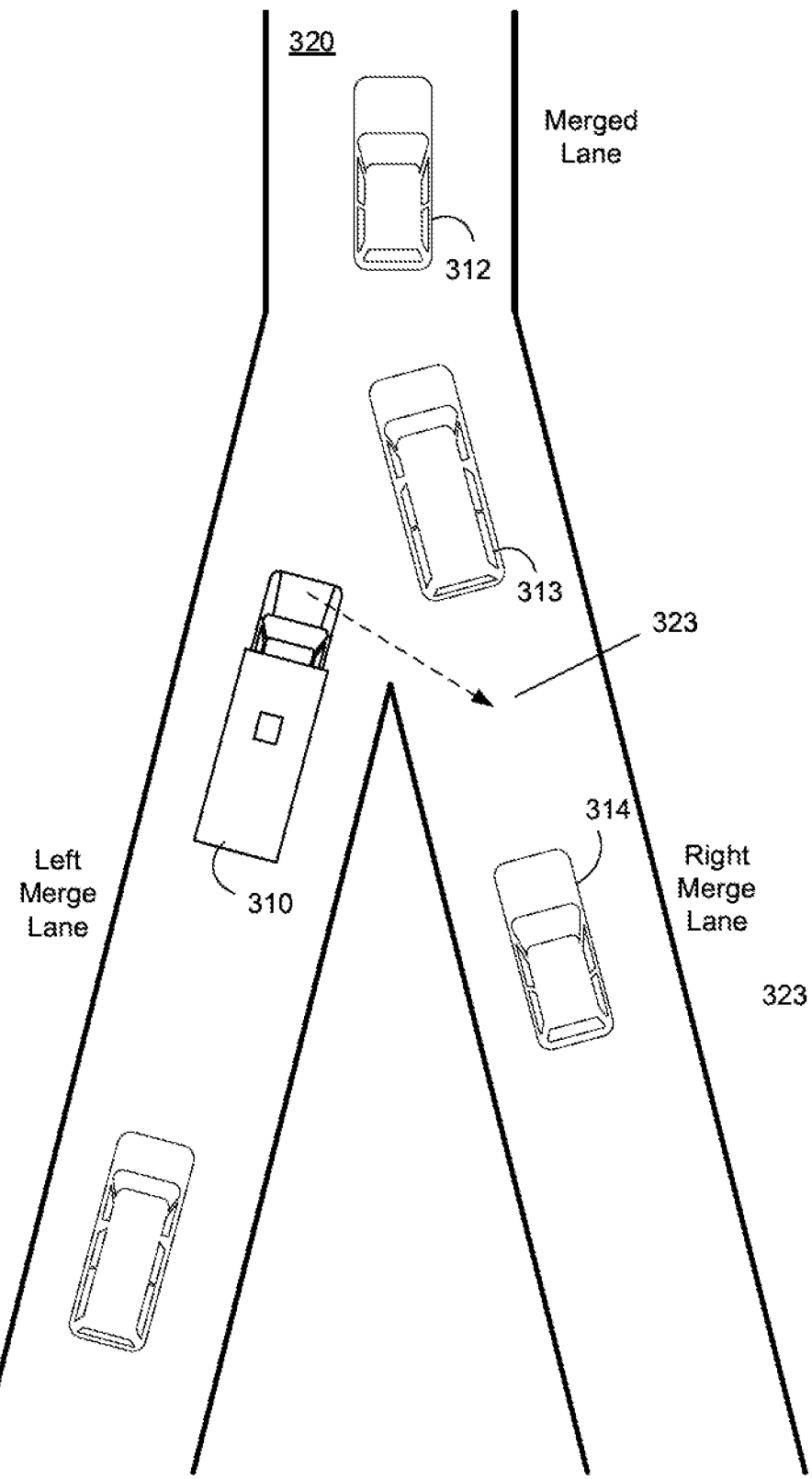

FIGS. 3A-3B illustrate an example of a merge performed by an ego vehicle 310 with respect to other vehicles 311, 312, 313, and 314 traveling together on a road 320 in accordance with example embodiments. For example, FIG. 3A illustrates a process 300 of the ego vehicle 310 identifying merge intentions of the other vehicles 311-314 over time and FIG. 3B illustrates a process 330 of the ego vehicle 310 selecting a merge point between the other vehicles 311-314. In this example, the road 320 includes a merge of two different lanes into one merged lane. However, it should also be appreciated that this process may be performed when an ego vehicle is attempting to merge into an adjacent lane even though the current lane of the ego vehicle is not ending or merging.

It can be difficult to accurately predict a behavior of a moving vehicle more than a few seconds into the future. Instead, in the example embodiments, behavior of surrounding vehicles can be monitored while an ego vehicle 310 takes a wait-and-see approach/plan when performing a merge operation. Here, the ego vehicle 310 may use a short window of time (e.g., a few seconds, etc.) during which the ego vehicle 310 repeatedly predicts merge intentions of the other vehicles 311-314.

To ensure that the ego vehicle 310 does not slow down unnecessarily while performing the wait-and-see approach, a new cost function can be embodied by the merge handler of the planning system of the ego vehicle 310. For example, the cost function may try to keep ego vehicle 310 at the speed limit, avoid large acceleration/deceleration and evaluate safety against fixed predictions. Instead of treating a predicted collision as something that should be avoided at almost all costs, the planner may take into account that it's just an imperfect prediction of the current likely future evolution of the scene which can change (and often will) when the scenario unfolds further. For example, the neighboring vehicle in the other merging lane may speed-up to go around the ego vehicle or slow down to let the ego vehicle in as the point of merge gets closer. Here, instead of avoiding the predicted collision the vehicle may treat such as simulated condition as having very high cost when evaluating where to merge. This gives the ego vehicle additional time to continue to analyze the data and update the merge decision. If a different action is available that does not involve a predicted/expected collision, the ego vehicle may choose the different action. The "go react" and "yield react" modeling with predictions makes it unlikely for a collision to be predicted.

For example, in addition to checking for a predicted collision, the planner may also check if it is feasible for other actors to change their behavior in the future to let the ego vehicle go ahead or try to move past the ego vehicle. As an example, the planner may check (i) could the ego vehicle 310 brake in this case with a small reaction time (e.g., 10 planning cycles), and (ii) could the other vehicle (e.g., in front, next to, etc.) brake in this case with a large reaction time (e.g., 2.0 second). If both checks are OK (e.g., more than 10 planning cycles and more than 2.0 seconds reaction time, etc.), the scenario is deemed allowed by the planner. Accordingly, the planner may force the ego vehicle 310 to start braking when it still can do so but not start braking too early. The extra time allows the software that embodies the example embodiments to continuously identify merge intentions of the other vehicles until closer to the point of the merge operation at which the decision on a merge position can be made by the ego vehicle 310.

According to various embodiments, the ego vehicle may plan an action that is least disruptive to ego vehicle and to other vehicles (e.g., to minimize overall braking for all vehicles involved using different cost functions) but that does allow for other vehicles to brake to let the ego vehicle into the lane during the merge. On the other hand, if the software did not provide for time to allow additional considerations of the merge intentions of the other vehicles, the ego vehicle would have less data especially closer to the point of the merge. In this case, the software/ego vehicle will usually defer to caution with other vehicles present and brake before the time is necessary.

In contrast, in the example embodiments, the system takes advantage of the additional time to identify when a neighboring vehicle is letting the ego vehicle in or going around the ego vehicle at a point in time closer to when the merge occurs which is also the point in time where more braking usually occurs. This additional braking allows the ego vehicle to more accurately determine that the neighboring vehicle is allowing them in. Likewise, if there is a lack of braking, the ego vehicle can more easily detect that the neighboring vehicle is trying to go around. Here, the "critical point" of the merge for each vehicle (i.e., where the most braking occurs) is much closer to the point of the merge rather than back at the beginning of the merge operation.

Accordingly, the system can iteratively predict a merge intention of the surround vehicles and select a merge position of the ego vehicle based on the predicted merge intentions. The ego vehicle may also perform a safety check for itself and verify its ability to react in time should something go wrong using various costs functions. Here, the ego vehicle may verify that its ability to react meets/satisfies a security threshold measured in planning cycles, distance, time, or the like.

In FIG. 3A, the ego vehicle senses data of each of the other vehicles 311, 312, 313, and 314, and builds merge profiles such as merge profiles 432, 434, 436, and 438 shown in FIG. 4B. In particular, FIG. 4B illustrates a database 430 that stores the plurality of merge profiles 432, 434, 436, and 438 in a predefined data structure such as a table, an XML file, a document, an HTML file, a spreadsheet, or the like. The ego vehicle 310 may write to the plurality of merge profiles 432, 434, 436, and 438 in the database 430 each time the ego vehicle 310 determines an update for the other vehicles 311, 312, 313, and 314. In FIG. 4B, the merge profiles 432, 434, 436, and 438 include fields for speed and merge intentions (predicted), but the merge profiles 432, 434, 436, and 438 may include different and/or additional data values such as acceleration, deceleration, locations, metrics, other model analysis, etc.

Referring now to FIG. 3B, the ego vehicle 310 evaluates the merge intentions of the other vehicles 311, 312, 313, and 314 over time and decides to merge into a gap 323 between vehicle 313 and vehicle 314. The decision on which gap to choose from among gaps 321, 322, 323, and 324 can be evaluated iteratively along with the merge intentions. As the merge intentions of the vehicles change over time, so to may the predicted merge position.

The improved merge handler described herein may solve some of the most "obvious" problems. For example, it can help the ego vehicle recognize when another vehicle is slowing down to let the ego vehicle in, or when another vehicle is not slowing down and is driving overly aggressive. The improved merge handler can also help maintain the traditional "zipper" effect that occurs when two lanes merge together into one lane. Furthermore, the model can address ego vehicles of different sizes including semi-trucks.

For example, the merge handler may model the motion of another vehicle based on predefined speed profiles shown in FIG. 5. In particular, in FIG. 5, a plurality of speed profiles 502, 504, and 506 are displayed on a graph 500. The graph 500 includes speed (measured in mph) versus time (measured in seconds). In the example embodiments, the marge handler may continuously compare the actions for the ego vehicle and the actions for the other vehicles in a same way by monitoring the merge intentions of the other vehicles using the predefined profiles such as the predefined speed profiles 502, 504, and 506 shown in FIG. 5. Here, the ego vehicle may continuously determine which speed profile applies to the other vehicles at quick intervals (every 0.2 seconds, etc.) over a predetermined window of time (e.g., 5 seconds, 8 seconds, etc.). This data may then be analyzed as a whole to make a decision on which position to select as a merge position (i.e., between which two other vehicles, etc.)

Figure 4A:
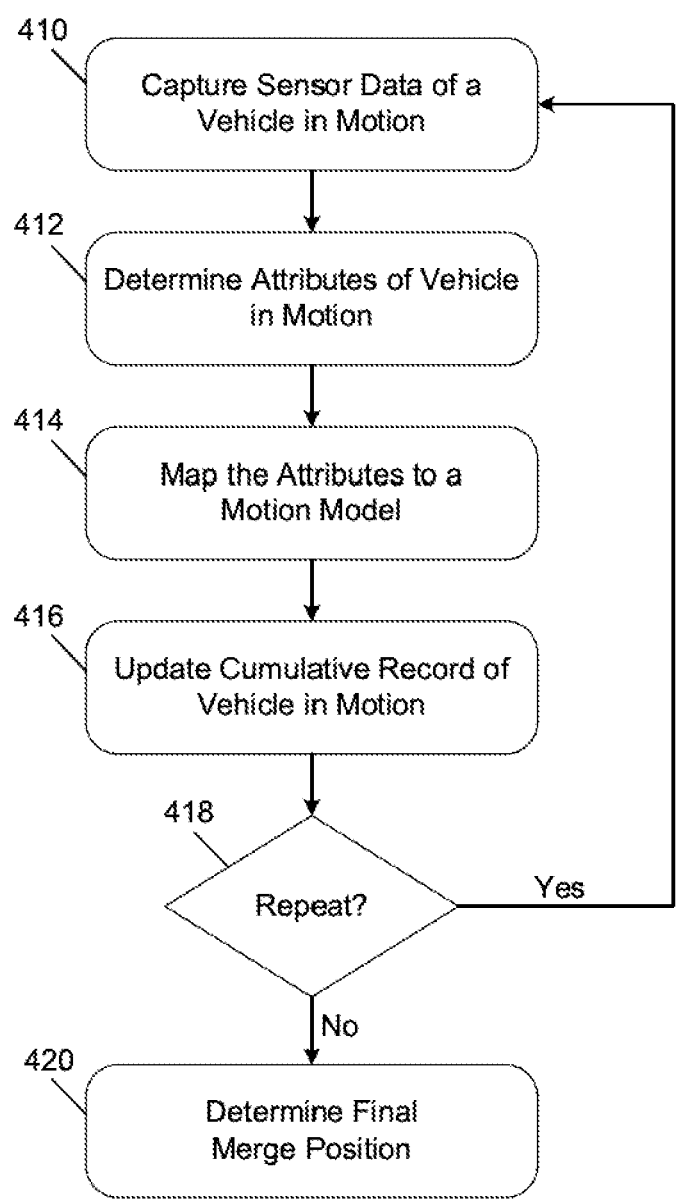
FIG. 4A is a diagram illustrating a process of determining a merge intention of a vehicle in accordance with example embodiments.

For example, FIG. 4A illustrates a process 400 of determining a merge intention of a vehicle in accordance with example embodiments. The merge intentions may be identified from the speed profiles 502, 504, and 506. The process 400 may be iteratively performed for multiple other vehicles adjacent to the ego vehicle, and at the same time (i.e., simultaneously). The interval of the process 400 may be short (e.g., a tenth of a second) and may be repeated for a short interval of time (e.g., 3-5 seconds, etc.). The process may begin when the merge is in the very near future (e.g., within a few hundred meters, etc.)

In 410, the ego vehicle may capture sensor data of the other vehicle in motion. The other vehicle may be in an adjacent lane (left or right) or a same lane as the ego vehicle. In 412, the ego vehicle may determine attributes (e.g., speed, acceleration, location, etc.) of the other vehicle. In 414, the ego vehicle may determine a current merge intention of the other vehicle based on the attributes in the new sensor data and historical data previously captured of the other vehicle (e.g., previous iterations). In 416, the ego vehicle may update a merge profile of the vehicle, such as the merge profiles 432, 434, 436, and 438 shown in FIG. 4B with the attributes and the merge intention.

In 418, the ego vehicle may determine whether the short interval is over (e.g., whether a predetermined number of iterations have been performed, whether the distance to the merge is closer than a predetermined distance, etc.) Furthermore, in 420, the ego vehicle may determine its merge position. It should be appreciated that the process 400 may be performed for other vehicles as well and the final decision on where to merge may be decided based on all of the other vehicles and their estimated merge intentions.

For example, if another vehicle is parallel to the ego vehicle, the ego vehicle may estimate whether it makes sense to go in front of the other vehicle or behind the other vehicle during the merge. The decision may be based on whether the other vehicle is speeding up or slowing down, and the rates of such change as well as the locations of the vehicle and the other vehicles. The merge handler may consider the different gaps that the ego vehicle could slot into (i.e., who goes ahead and who goes behind of ego). Furthermore, the ego vehicle may generate a simulation/plan for the other vehicles and compare the plans of actors (over several cycles) with the actual observed behavior to verify what others are doing.

The basic idea of the algorithm is to identify each gap that the ego vehicle can go into, and use a function to determine an acceptable trajectory to go into the respective gaps. Then the system can check/verify for each gap i) how much would it cost to yield to the leader and ii) how much would it cost for a new follower to yield to the ego vehicle. Each vehicle that is positioned around the ego vehicle may follow various speed profiles that are based on a GO profile (502 in FIG. 5) and a yield profile (506 in FIG. 5). The go profile may perform a slight delayed reaction but continues to go ahead of the ego vehicle. The yield profile is slowing down to allow the ego vehicle to move over. Furthermore, both the go profile and the yield profile may be evaluated against a simulation of the scene forward in time to verify whether other vehicles surrounding the ego vehicle can react in time to change their action (e.g., to let the ego vehicle go in front thereof, etc.)

At each interval, the ego vehicle may simulate the merge intentions of the ego vehicle and the other vehicles. If there are multiple cars in the adjacent lane, the ego vehicle may build merge profiles for each of the cars resulting in a chain of merge profiles corresponding to a chain of vehicles that the ego vehicle needs to merge into. Which vehicles are analyzed by the ego vehicle may be based on a distance threshold (e.g., 50 meters, 100 meters, 200 meters, etc.) which may be predefined or determined dynamically. For example, the ego vehicle may simulate the ego vehicle's plan for each gap and the merge intentions of the other vehicles. One big advantage over related merge handlers is that vehicles that are ahead of the merge are included in this simulation. This can be used to ensure that the interlocking zipper effect when performing the merge. In some embodiments, the system may ignore simulating the vehicles after the vehicle immediately following the ego vehicle. Furthermore, the predicted merge intentions may be evaluated against a simulation of the scene. For example, the system may execute one or more heuristics which can evaluate whether a vehicle travelling in the adjacent lane still can still commit to yielding to the ego vehicle during the merge operation.

The ego vehicle may determine the current merge intention of a vehicle based on a scheme in which the ego vehicle compares historical predictions with the actual ground truth. In some cases, the ego vehicle may perform L1 regularized smoothing on the jerk of each vehicle based on the vehicle's speed profile for the last few seconds. This gives a speed profile that mostly consists of straight lines with "kinks" in it where with high jerk where the "trend" changes, e.g., from speeding up to slowing down. In addition, the ego vehicle may compare the smoothed acceleration of the other vehicle for the last time step in these few seconds (best estimate of the current "trend") with the acceleration needed for the different speed profiles like a filtering algorithm. The trend may be based on the slope of the line. The identification of the trend may be further enhanced by applying L1 smoothing to the estimated speed values prior to the trend identification. Thus, the ego vehicle can identify which merge intention the other vehicle case from among a plurality of different merge intentions over time. The merge intentions may change, which can cause the ego vehicle to change its decision on where to merge. The identified trend of a vehicle may be determined from a pattern of merge intentions as they change or do not change over time which may be identified from the series of values (e.g., speed values, etc.) estimated of a respective vehicle. For example, one instance of slowing down may be some identification that a vehicle is allowing another vehicle to move in front of it, however, multiple instances of slowing down can be a better indicator as this shows a trend of slowing down to allow the other vehicle to move in front.

The L1 smoothing may be used to capture strong trends of the vehicle and to not over-react to slight fluctuations of speed. The best current estimate of the trend may be compared to the prediction for each of the different speed profiles corresponding to the merge intentions shown in FIG. 5.

Figure 6:
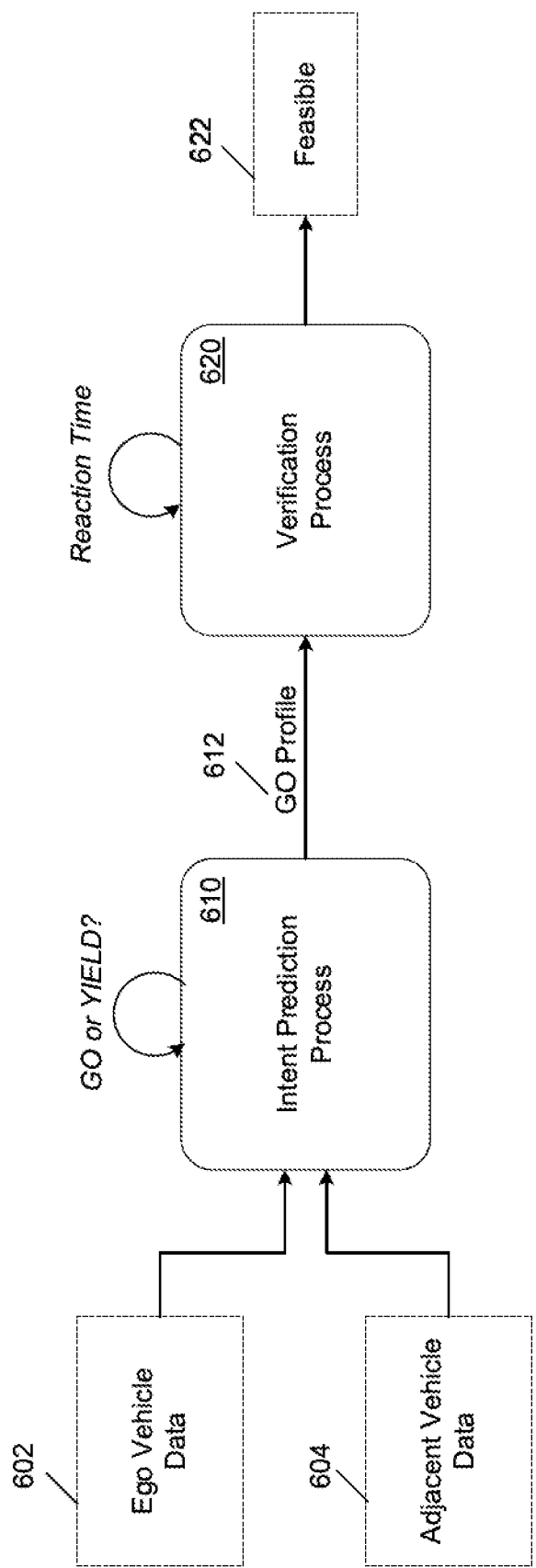
FIG. 6 is a diagram illustrating a process of verifying a reaction time of a vehicle in accordance with example embodiments.

FIG. 6 illustrates a process 600 of verifying a reaction time of a predicted intent of an ego vehicle in accordance with example embodiments. Here, the ego vehicle may execute an intent prediction process 610 to determine/predict a merge intent of an adjacent vehicle based on adjacent vehicle data 604. An output 612 of the intent prediction process 610 may be input to a verification process 620 which evaluates the ability of the adjacent vehicle to change its speed profile from a "go" profile to a "yield" profile after a reaction time, and generates an output 622 with the indication. If the vehicle can successfully react, the verification process 620 is a success. If the ego vehicle cannot react or the adjacent vehicle cannot react, the cost of such is considered as an important factor when making a decision on merge position.

For example, a pattern of merge intentions may be used to predict a likely merge intention of a vehicle. The process 600 may also simulate the merge operation forward into the future and verify that the predicted merge intention of the vehicle still leaves the vehicle enough time to react to an unexpected event on the road such as a vehicle in front slowing down harshly, etc.

FIG. 7 illustrates a method 700 of executing a merge operation based on merge intentions of other vehicles over time in accordance with an example embodiment. As an example, the method 700 may be performed by a processor, computer, chip, apparatus, memory, etc., that is on a vehicle such as an ego vehicle. Referring to FIG. 7, in 710, the method may include iteratively estimating a series of values associated with one or more vehicles traveling in an adjacent lane with respect to an ego vehicle. For example, the ego vehicle may use one or more of a camera, a lidar sensor, a radar sensor, and the like, to sense motion attributes of other vehicles on the road such as speed, acceleration, deceleration, direction, and the like. In 720, the method may include identifying a trend over time associated with the one or more vehicles from the iteratively estimated series of values. The trend may be a pattern of estimated intentions of a vehicle that can provide more information about how the vehicle is approaching the merge.

In 730, the method may include determining merge intentions of the one or more vehicles with respect to the ego vehicle based on the identified trend over time. In 740, the method may include verifying the merge intentions against a simulated change in the trend associated with the one or more vehicles. For example, the system may verify each of the predicted merge intentions against a react profile to ensure that each of the predicted intentions of the vehicles will leave time to react to unforeseen events. In 750, the method may include selecting a merge position of the ego vehicle with respect to the one or more vehicles within the lane based on the verified merge intentions. In 760, the method may include executing an instruction to cause the ego vehicle to perform a merge operation based on the selected merge position.

In some embodiments, the iteratively estimating may include iteratively identifying a trend of a speed of a vehicle from among the one or more vehicles traveling in the adjacent lane based on sensor data iteratively captured by the ego vehicle and a plurality of speed profiles. In some embodiments, the determining may include predicting a merge intention of a vehicle from among the one or more vehicles based on a comparison of an identified trend of a speed value of the vehicle over time with respect to a go profile and a yield profile. In some embodiments, the verifying may include verifying that the ego vehicle is able to execute the go profile and the yield profile based on a react profile. In some embodiments, the method may further include executing a smoothing algorithm on estimated speed values of a vehicle to identify the trend of the speed value.

In some embodiments, the determining may include predicting a plurality of merge intentions for a plurality of vehicles traveling within the adjacent lane, respectively, based on respective estimated trends in speeds of the plurality of vehicles over time. In some embodiments, the selecting may include selecting a gap between a lead vehicle and a following vehicle in which to merge based on a combination of the lead vehicle being determined to be following a go intention and the following vehicle being determined to be following a yield intention. In some embodiments, the selecting may include selecting a gap between a lead vehicle and a following vehicle in which to merge based on the lead vehicle and the following vehicle being determined to be following a go profile and the following vehicle being verified to have enough time to yield to the ego vehicle.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/ machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A method comprising:
    storing a series of values associated with one or more vehicles traveling in an adjacent lane with respect to an ego vehicle;
    iteratively estimating merge intentions of the one or more vehicles with respect to the ego vehicle based on the stored series of values;
    selecting a merge position of the ego vehicle with respect to the one or more vehicles based on iteratively estimated merge intentions; and
    executing an instruction to cause the ego vehicle to perform a merge operation based on the selected merge position.

2. The method of claim 1, wherein the storing comprises iteratively capturing a series of speed values of the one or more other vehicles travelling in the adjacent lane via sensors of the ego vehicle.

3. The method of claim 1, wherein the iteratively estimating comprises iteratively estimating the merge intentions of the one or more vehicles based on a series of speed values of each vehicle from among the one or more vehicles.

4. The method of claim 1, wherein the iteratively estimating comprises iteratively estimating the merge intentions of the one or more vehicles based on a sliding window of values within the stored series of values.

5. The method of claim 1, wherein the method further comprises generating a graph of the stored series of values, wherein the graph comprises a series of data points graphed over time which represent the series of values.

6. The method of claim 5, wherein the method further comprises executing an L1 smoothing algorithm based on the graph to identify a trend of the value, wherein the selecting comprises selecting the merge position based on the trend of the value.

7. The method of claim 1, wherein the selecting comprises simulating a process of the ego vehicle merging into a plurality of different gaps based on the iteratively estimated merge intentions of the one or more vehicles, and selecting a gap from among the plurality of gaps as the merge position based on the simulating.

8. The method of claim 1, wherein the method further comprises verifying the selected merge position based on an estimated reaction time of the one or more vehicles with respect to a gap corresponding to the selected merge position.

9. An apparatus comprising:
    a storage configured to store a series of values associated with one or more vehicles traveling in an adjacent lane with respect to an ego vehicle; and
    a processor configured to
        iteratively estimate merge intentions of the one or more vehicles with respect to the ego vehicle based on the stored series of values,
        select a merge position of the ego vehicle with respect to the one or more vehicles based on iteratively estimated merge intentions, and
        execute an instruction to cause the ego vehicle to perform a merge operation based on the selected merge position.

10. The apparatus of claim 9, wherein the apparatus is coupled to one or more sensors that are configured to iteratively capture a series of speed values associated with the one or more other vehicles travelling in the adjacent lane.

11. The apparatus of claim 9, wherein the processor is configured to iteratively estimate the merge intentions of the one or more vehicles based on a series of speed values of each vehicle from among the one or more vehicles.

12. The apparatus of claim 9, wherein the processor is configured to iteratively estimate the merge intentions of the one or more vehicles based on a sliding window of values within the stored series of values.

13. The apparatus of claim 9, wherein the processor is further configured to generate a graph of the stored series of values, wherein the graph comprises a series of data points graphed over time which represent the series of values.

14. The apparatus of claim 13, wherein the processor is further configured to execute an L1 smoothing algorithm based on the graph to identify a trend of the value, and select the merge position based on the trend of the value.

15. The apparatus of claim 9, wherein the processor is configured to simulate a process of the ego vehicle merging into a plurality of different gaps based on the iteratively estimated merge intentions of the one or more vehicles, and select a gap from among the plurality of gaps as the merge position based on the simulating.

16. The apparatus of claim 9, wherein the processor is further configured to verify the selected merge position based on an estimated reaction time of the one or more vehicles with respect to a gap corresponding to the selected merge position.

17. A non-transitory computer-readable medium comprising instructions which when executed by a processor cause the processor to perform a method comprising:

storing a series of values associated with one or more vehicles traveling in an adjacent lane with respect to an ego vehicle;

iteratively estimating merge intentions of the one or more vehicles with respect to the ego vehicle based on the stored series of values;

selecting a merge position of the ego vehicle with respect to the one or more vehicles based on iteratively estimated merge intentions; and executing an instruction to cause the ego vehicle to perform a merge operation based on the selected merge position.

18. The non-transitory computer-readable medium of claim 17, wherein the iteratively estimating comprises iteratively estimating the merge intentions of the one or more vehicles based on a series of speed values of each vehicle from among the one or more vehicles.

19. The non-transitory computer-readable medium of claim 17, wherein the iteratively estimating comprises iteratively estimating the merge intentions of the one or more vehicles based on a sliding window of values within the stored series of values.

20. The non-transitory computer-readable medium of claim 17, wherein the selecting comprises simulating a process of the ego vehicle merging into a plurality of different gaps based on the iteratively estimated merge intentions of the one or more vehicles, and selecting a gap from among the plurality of gaps as the merge position based on the simulating.

* * * * *